(12) United States Patent
Kominami

(10) Patent No.: US 10,195,920 B2
(45) Date of Patent: Feb. 5, 2019

(54) VEHICULAR AIR CONDITIONING DEVICE

(71) Applicant: Mitsubishi Heavy Industries Thermal Systems, Ltd., Tokyo (JP)

(72) Inventor: Satoshi Kominami, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 0 days.

(21) Appl. No.: 15/770,938

(22) PCT Filed: Oct. 3, 2016

(86) PCT No.: PCT/JP2016/079279
§ 371 (c)(1),
(2) Date: Apr. 25, 2018

(87) PCT Pub. No.: WO2017/081954
PCT Pub. Date: May 18, 2017

(65) Prior Publication Data
US 2018/0251006 A1    Sep. 6, 2018

(30) Foreign Application Priority Data

Nov. 12, 2015    (JP) .................................. 2015-222013

(51) Int. Cl.
*B60H 1/00*    (2006.01)
*B60H 1/10*    (2006.01)
*B60H 1/32*    (2006.01)

(52) U.S. Cl.
CPC ........... *B60H 1/00678* (2013.01); *B60H 1/00* (2013.01); *B60H 1/00028* (2013.01);
(Continued)

(58) Field of Classification Search
CPC .. B60H 1/00678; B60H 1/10; B60H 1/00064; B60H 1/00842; B60H 1/3227;
(Continued)

(56) References Cited

U.S. PATENT DOCUMENTS 6,463,998 B1 *  10/2002  Shindo ............... B60H 1/00028
                                                                165/204
6,669,548 B2 *  12/2003  Fujiwara ............ B60H 1/00685
                                                                165/41

(Continued)

FOREIGN PATENT DOCUMENTS

JP        5-96932 A       4/1993
JP        7-290934 A      11/1995
(Continued)

OTHER PUBLICATIONS

International Search Report and Written Opinion of the International Searching Authority (Forms PCT/ISA/210 and PCT/ISA/237) for Application No. PCT/JP2016/079279, dated Dec. 6, 2016, with an English translation.

*Primary Examiner* — Claire Rojohn, III
(74) *Attorney, Agent, or Firm* — Birch, Stewart, Kolasch & Birch, LLP

(57) ABSTRACT

This vehicular air conditioning device includes: an evaporator; a heater core; a unit case including a cooling space configured to accommodate the evaporator, a heating space connected to the cooling space and configured to accommodate the heater core, an air mixing space connected to the cooling space and the heating space, and a foot outlet flow channel; an air mixing damper provided among the cooling space, the heating space, and the air mixing space, and configured to rotate between a maximum cooling position (Pc) and a maximum heating position (Ph) to adjust a ratio of air to be introduced into the air mixing space; and a foot switching damper capable of partitioning the air mixing
(Continued)

space and the foot outlet flow channel. The air mixing damper includes a reheat preventing damper having a principal plane. The foot switching damper does not protrude further toward the air mixing space side than an imaginary plane including the principal plane.

5 Claims, 2 Drawing Sheets

(52) U.S. Cl.
CPC ..... *B60H 1/00064* (2013.01); *B60H 1/00835* (2013.01); *B60H 1/00842* (2013.01); *B60H 1/10* (2013.01); *B60H 1/3227* (2013.01); *B60H 2001/00107* (2013.01); *B60H 2001/00714* (2013.01)

(58) Field of Classification Search
CPC .. B60H 1/00835; B60H 1/00028; B60H 1/00; B60H 2001/00714; B60H 2001/00107
USPC ........................................................ 165/204
See application file for complete search history.

(56) References Cited

U.S. PATENT DOCUMENTS

| | | | | |
|---|---|---|---|---|
| 7,931,075 B2* | 4/2011 | Ito | ...................... | B60H 1/00028 |
| | | | | 165/122 |
| 9,180,752 B2* | 11/2015 | Buczek | .............. | B60H 1/00064 |
| 9,694,652 B2* | 7/2017 | An | ...................... | B60H 1/3414 |
| 9,821,628 B2* | 11/2017 | Gesell | ................ | B60H 1/00064 |
| 2003/0094262 A1* | 5/2003 | Kondo | .............. | B60H 1/00064 |
| | | | | 165/42 |
| 2004/0093884 A1* | 5/2004 | Seki | ................... | B60H 1/00685 |
| | | | | 62/244 |
| 2004/0152410 A1* | 8/2004 | Seki | ................... | B60H 1/00685 |
| | | | | 454/139 |
| 2005/0098311 A1* | 5/2005 | Okumura | ........... | B60H 1/00064 |
| | | | | 165/204 |
| 2007/0181295 A1* | 8/2007 | Masatsugu | ......... | B60H 1/00678 |
| | | | | 165/202 |
| 2007/0204985 A1* | 9/2007 | Fukagawa | .......... | B60H 1/00685 |
| | | | | 165/203 |
| 2007/0266726 A1* | 11/2007 | Tada | .................. | B60H 1/00064 |
| | | | | 62/331 |
| 2010/0120348 A1* | 5/2010 | Tanaka | ............... | B60H 1/00678 |
| | | | | 454/159 |
| 2010/0139308 A1* | 6/2010 | Eguchi | ............... | B60H 1/00671 |
| | | | | 62/408 |
| 2010/0263828 A1* | 10/2010 | Chikagawa | ........ | B60H 1/00028 |
| | | | | 165/59 |
| 2011/0005730 A1* | 1/2011 | Habasita | ............ | B60H 1/00028 |
| | | | | 165/121 |
| 2011/0073273 A1* | 3/2011 | Seto | ................... | B60H 1/00064 |
| | | | | 165/42 |
| 2011/0284183 A1* | 11/2011 | Yamashita | ......... | B60H 1/00678 |
| | | | | 165/63 |
| 2013/0014913 A1* | 1/2013 | Hara | ................... | B60H 1/0005 |
| | | | | 165/103 |
| 2013/0152619 A1* | 6/2013 | Ito | ...................... | B60H 1/00028 |
| | | | | 62/408 |

FOREIGN PATENT DOCUMENTS

| | | |
|---|---|---|
| JP | 3692636 B2 | 9/2005 |
| JP | 2007-45362 A | 2/2007 |
| JP | 2007-307928 A | 11/2007 |
| JP | 2009-269425 A | 11/2009 |
| JP | 2011-11584 A | 1/2011 |
| JP | 2013-18444 A | 1/2013 |

* cited by examiner

VEHICULAR AIR CONDITIONING DEVICE

TECHNICAL FIELD

The present invention relates to a vehicular air conditioning device. This application claims priority based on JP 2015-222013 filed in Japan on Nov. 12, 2015, of which the contents are incorporated herein by reference.

BACKGROUND ART

A vehicular air conditioning device used in an automobile and the like includes a heater core which is a heat exchanger for heating, an evaporator which is a heat exchanger for cooling, an air mixing space for mixing warm air that has passed through the heater core and cool air that has passed through the evaporator, and an air mixing damper for changing a mixing ratio between the warm air and cool air in the air mixing space. As an example of such a device, there is known a vehicular air conditioning device disclosed in Patent Document 1 below.

The vehicular air conditioning device disclosed in Patent Document 1 includes an air flow rate adjustment door, which is provided between a warm air passage communicated with the heater core and a cool air passage communicated with the evaporator. Furthermore, the air flow rate adjustment door includes an adjustment door part disposed on the evaporator side, and an auxiliary door disposed on the heater core side, with respect to a rotating shaft. Each of the adjustment door part and the auxiliary door defines a channel together with case wall surfaces respectively facing the adjustment door part and the auxiliary door.

When the air flow rate adjustment door pivots on the rotating shaft, the adjustment door part adjusts the flow rate of the cool air from the evaporator, while the auxiliary door controls the flow rate of the warm air from the heater core. Specifically, the air flow rate adjustment door is made possible to appropriately adjust its pivoting amount between the maximum heating state and the maximum cooling state. In the maximum heating state, the adjustment door part intercepts the cool air from the evaporator so that the warm air from the heater core is maximized. In the maximum cooling state, the auxiliary door intercepts the warm air from heater core so that the cool air from the evaporator is maximized.

For the vehicular air conditioning device configured as described above, it is necessary to suppress inadvertent interchange of heat between the heater core and the evaporator in view of enhancing thermal efficiency.

PRIOR ART DOCUMENTS

Patent Document

Patent Document 1: JP 3692636 B

SUMMARY OF THE INVENTION

Problem to be Solved by the Invention

However, in the device disclosed in Patent Document 1 above, during the maximum cooling state, the case wall surface facing the tip of the auxiliary door further protrudes toward the cool air passage side than the auxiliary door. This may cause the cool air supplied from the evaporator to flow to the heater core side, especially during the maximum cooling state. That is, the cool air to which the heat quantity of the heater core has been added is supplied into the vehicular interior, so that apparent cooling efficiency may decrease significantly.

The present invention provides a vehicular air conditioning device with further enhanced cooling efficiency.

Means for Solving the Problem

According to a first aspect of the present invention, a vehicular air conditioning device including: an evaporator configured to cool air; a heater core configured to heat air; a unit case including a cooling space configured to accommodate the evaporator, a heating space connected to the cooling space and configured to accommodate the heater core, an air mixing space connected to the cooling space and the heating space, and a foot outlet flow channel connected to the air mixing space; an air mixing damper provided among the cooling space, the heating space, and the air mixing space, in the unit case, and configured to rotate between a maximum cooling position and a maximum heating position to adjust a ratio of air to be introduced into the air mixing space between the air from the cooling space and the air from the heating space; and a foot switching damper rotatable to a closing position for partitioning the air mixing space and the foot outlet flow channel. The air mixing damper includes a reheat preventing damper including a principal plane facing the air mixing space at the maximum cooling position, and configured to define a gap between a tip of the air mixing damper and a tip of the foot switching damper at the maximum cooling position, and to partition the heating space and the air mixing space, and the foot switching damper at the closing position does not further protrude toward the air mixing space side than an imaginary plane including the principal plane of the reheat preventing damper at the maximum cooling position.

According to such a configuration, when the air mixing damper is located at the maximum cooling position, the foot switching damper is in a state of not further protruding toward the air mixing space side than the imaginary plane including the principal surface of the reheat preventing damper. Accordingly, it is possible to reduce the possibility that the air supplied from the cooling space flows over the reheat preventing damper into the heating space. In other words, almost all amount of the air supplied from the cooling space is guided by the reheat preventing damper, and flows into the air mixing space.

Therefore, it is possible to reduce the possibility that the heat quantity of the heater core is added to the air supplied from the cooling space.

According to a second aspect of the present invention, in the vehicular air conditioning device of the first aspect, the foot switching damper at the closing position may be further retracted than the imaginary plane including the principal plane of the reheat preventing damper at the maximum cooling position.

According to such a configuration, when the air mixing damper is located at the maximum cooling position, the foot switching damper at the closing position further retracts than the imaginary plane including the principal plane of the reheat preventing damper. Accordingly, it is possible to reduce the possibility that the air supplied from the cooling space flows over the reheat preventing damper into the heating space.

According to a third aspect of the present invention, in the vehicular air conditioning device of the first or second aspect, the air mixing damper may include an air mixing damper body configured to partition the cooling space and the heating space at the maximum cooling position, to communicate the cooling space with the air mixing space, to communicate the cooling space with the heating space at the maximum heating position, and to partition the cooling space and the air mixing space.

According to such a configuration, when the air mixing damper is located at the maximum cooling position, the air mixing damper body partitions the cooling space and the heating space, and communicates the cooling space with the air mixing space. In other words, the heating space is brought into a state of being isolated from the cooling space and the air mixing space. As a result, it is possible to reduce the possibility of mixing warm air from the heating space with cool air flowing from the cooling space.

According to a fourth aspect of the present invention, in the vehicular air conditioning device of any one of the first to third aspect, the unit case may include an intermediary space connected to the air mixing space, the closing position is a position for the foot switching damper to partition the air mixing space and the foot outlet flow channel and to communicate the air mixing space with the intermediary space, and the foot switching damper communicates the closing position with the air mixing space and the foot outlet flow channel, and is rotatable between a communicating position for closing the air mixing space and the intermediary space.

According to such a configuration, when the foot switching damper is located at the closing position, the air mixing space is communicated with the intermediary space, and thus it is possible to feed the air from the above-described air mixing space to a channel different from the foot outlet flow channel. On the other hand, when the foot switching damper is located at the communicating position, the air mixing space is communicated with the foot outlet flow channel, and thus it is possible to feed the air toward the foot outlet flow channel.

According to a fifth aspect of the present invention, in the vehicular air conditioning device according to the fourth aspect, the foot switching damper may include an elastic part at a region facing the air mixing space at the closing position, the elastic part abutting against the unit case at the communicating position.

According to such a configuration, when the foot switching damper is located at the communicating position, the elastic part is interposed between the foot switching damper and the unit case. Furthermore, in the state of abutting against the unit case, the elastic part is slightly subjected to elastic deformation. As a result, it is possible to sufficiently close the gap between the foot switching damper and the unit case. In other words, when the foot switching damper is located at the communicating position, it is possible to supply almost all amount of the air fed from the air mixing space to the foot outlet flow channel.

According to a sixth aspect of the present invention, in the vehicular air conditioning device of the fourth or fifth aspect, the unit case may include a face outlet flow channel connected to the intermediary space and a defroster outlet flow channel connected to the intermediary space, and the vehicular air conditioning further includes a face-defroster switching damper configured to adjust a ratio of air from the intermediary space between air to be introduced to the face outlet flow channel and air to be introduced to the defroster outlet flow channel.

According to such a configuration, it is possible for the face-defroster switching damper to guide the air flowing through the intermediary space to the face outlet flow channel and the defroster outlet flow channel. In other words, the air flowing through the intermediary space is guided to a plurality of channels, and thus it is possible to use the air more effectively.

Effect of Invention

According to the vehicular air conditioning device described above, the cooling efficiency is further enhanced.

DESCRIPTION OF THE PREFERRED EMBODIMENTS

Figure 1:
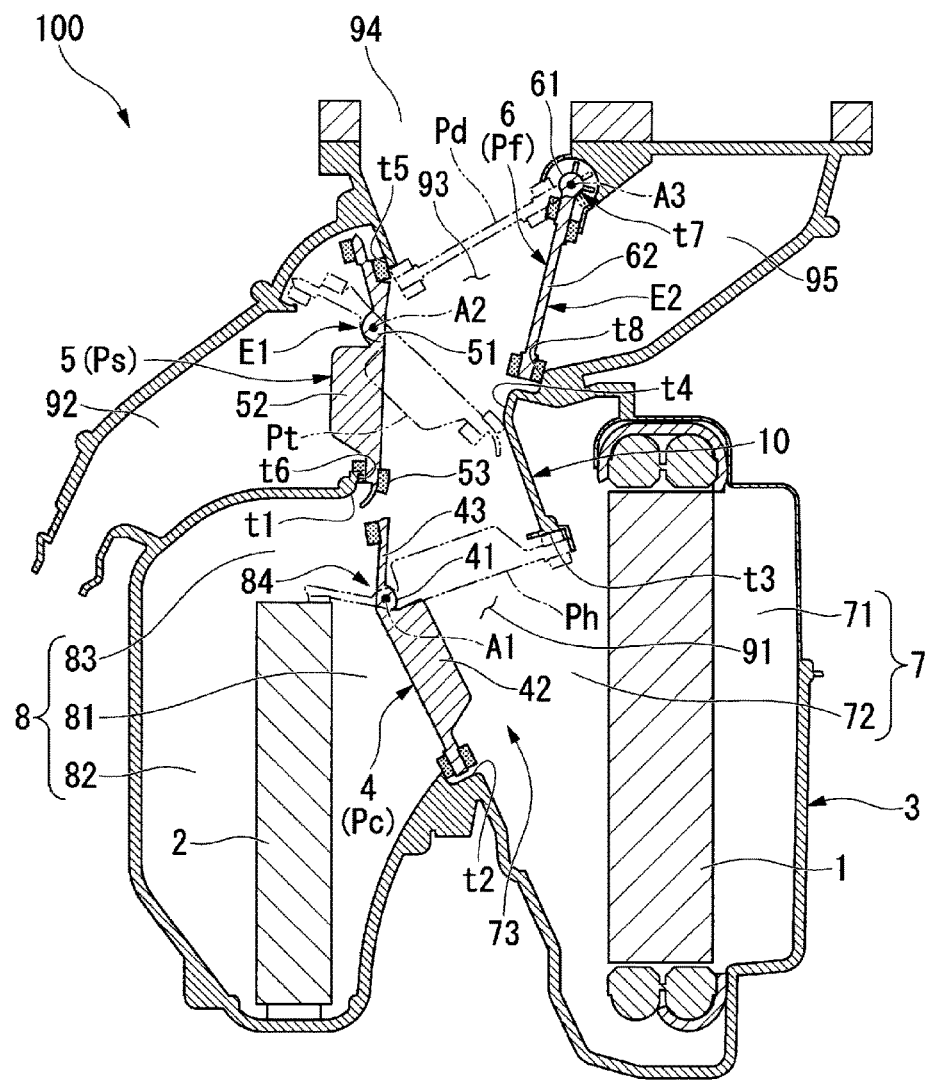
FIG. 1 is a cross-sectional view of a vehicular air conditioning device according to an embodiment of the present invention.

Embodiments of the present invention will be described below with reference to the drawings. As illustrated in FIG. 1, a vehicular air conditioning device 100 according to the present embodiment includes an evaporator 1, a heater core 2, a unit case 3 for casing the evaporator 1 and the heater core 2, and an air mixing damper 4, a foot switching damper 5, and a face-defroster switching damper 6. The dampers 4, 5, and 6 adjust air flow inside the unit case 3.

FIG. 1 is a cross-sectional view of the vehicular air conditioning device 100 as viewed in the width direction transverse to the traveling direction of vehicular on which the vehicular air conditioning device 100 is mounted. In the following description, the "as viewed in section" refers to a cross section as viewed in the width direction.

As the evaporator 1, a heat exchanger for cooling is used which employs a vapor compression refrigerating cycle, by way of example. A low-pressure refrigerant flowing through the evaporator 1 evaporates by absorbing heat from the air flowing around the evaporator 1, and thus this air is cooled. In the present embodiment, the evaporator 1 is formed in a thick plate shape.

As the heater core 2, a hot-water heat exchanger for heating is used which heats air by using the hot water (engine-cooling fluid) from a vehicle engine, not illustrated, or the like. The heat quantity of the hot water flowing through the heater core 2 is imparted to the air flowing around the heater core 2, and thus this air is heated. In the present embodiment, the heater core 2 is also formed in a thick plate shape, which is similar to the evaporator 1.

The unit case 3 accommodates the evaporator 1 and the heater core 2 and defines an air flow channel in the inside. More specifically, a cooling space 7, a heating space 8, an air mixing space 91, a foot outlet flow channel 92, an intermediary space 93, a face outlet flow channel 94, and a defroster outlet flow channel 95 are formed within the unit case 3.

The evaporator 1 is accommodated in the cooling space 7. The evaporator 1 partitions the cooling space 7 into two spaces (a first space and a second space). More specifically, the cooling space 7 includes an introducing space 71 and a cool air supply space 72. A space formed on one side of the evaporator 1 (i.e., the first space) is the introducing space 71, through which the air introduced by a fan, not illustrated, or the like flows. A space formed on the other side of the evaporator 1 (a space formed on the side opposite the introducing space 71 across the evaporator 1, i.e., the second space) is the cool air supply space 72, through which the air cooled by the evaporator 1 flows. In this way, the air in the introducing space 71 is applied to and is brought into contact with the evaporator 1 by the blowing of the fan, and is then cooled. Such cooled air flows into the cool air supply space 72. The outlet of the cool air supply space 72 is a cool air outlet 73.

The heater core 2 is accommodated in the heating space 8. Furthermore, the heating space 8 and the cooling space 7 are in communication with each other via a part of the air mixing space 91, as will be described later. More specifically, the heating space 8 is disposed at a position facing the above-described cooling space 7 from the cool air supply space 72 side.

The heater core 2 partitions the inside of the heating space 8 into three spaces (a third space, a fourth space, and a fifth space). The heating space 8 includes a second introducing space 81, a warm air supply space 82, and a return space 83. A space on one side of the heater core 2 (a space facing the cooling space 7, i.e., the third space) is the second introducing space 81, to which the air supplied from the above-described cool air supply space 72 is guided. A space on the other side of the heater core 2 (a space formed on the side opposite the second introducing space 81 across the heater core 2, i.e., the fourth space) is the warm air supply space 82 through which the air heated by the heater core 2 flows. In other words, the air in the second introducing space 81 is heated by contacting the heater core 2, and flows into the warm air supply space 82.

Furthermore, within the heating space 8, a space is formed between the upper end part of the heater core 2 and the inner wall of the unit case 3. This space serves as the return space 83 (i.e., the fifth space) for returning the air, which has sequentially passed through the second introducing space 81 and the warm air supply space 82, to the air mixing space 91, as will be described later. The outlet of the return space 83 is a warm air outlet 84.

The cooling space 7 and the heating space 8, which are configured as described above, are in communication with each other via the air mixing space 91. In the air mixing space 91, the air cooled in the cooling space 7 (cool air) and the air heated in the heating space 8 (warm air) are mixed. More specifically, the air mixing space 91 is a channel which is in communication with the cool air supply space 72 in the cooling space 7 and the warm air supply space 82 in the heating space 8, and which extends generally upward. A guiding partition wall part 10 for guiding the air flowing through the air mixing space 91 upward is provided on the cooling space 7 side in the air mixing space 91.

Furthermore, the air mixing space 91 includes the air mixing damper 4 for, adjusting a ratio of mixing the air from the cooling space 7 and the air from the heating space 8. As illustrated in FIG. 1, the air mixing damper 4 is a plate-like member that is pivotably supported in a manner pivotable on the warm air outlet 84 in the heating space 8. More specifically, the air mixing damper 4 includes a first support part 41, which turns about a first axis A1 extending in the vehicle width direction, an air mixing damper body 42, and a reheat preventing damper 43. The air mixing damper body 42 and the reheat preventing damper 43 are disposed across the first support part 41, and both extend along a plane transverse to the width direction.

In the present embodiment, the first support part 41 is provided on a straight line virtually extending between the upper end part (a first end part t1) and the lower end part (a second end part t2) of the warm air outlet 84. Furthermore, as viewed in section, the first support part 41 is provided at a position vertically corresponding to the upper end part of the heater core 2. In addition, the size from the first support part 41 to the lower end part (a third end part t3) of the above-described guiding partition wall part 10 is substantially the same as the size from the first support part 41 to the second end part t2.

As viewed in section, the air mixing damper body 42 extends through a size from the first support part 41 to the above-described second end part t2 (i.e., the size from the first support part 41 to the third end part t3 of the guiding partition wall part 10). On the other hand, the reheat preventing damper 43 extends in a direction opposite to the air mixing damper body 42 from the first support part 41. More particularly, the reheat preventing damper 43 extends in a direction deflected to the air mixing space 91 side with respect to a plane on which the air mixing damper body 42 extends. The plane on which the reheat preventing damper 43 extends is a principal plane S1 (see FIG. 2). The principal plane S1 is connected with the tip of the reheat preventing damper 43, and forms a part of an imaginary plane Sv, as will be described later.

The air mixing damper 4 configured as described above is made rotatable between a position (a maximum cooling position Pc) indicated by a solid line in FIG. 1 and a position (a maximum heating position Ph) indicated by a dashed line in FIG. 1. At the maximum cooling position Pc, the leading end (the end opposite the first support part 41) of the air mixing damper body 42 abuts against the second end part t2 of the warm air outlet 84 from the air mixing space 91 side. At the same time, the reheat preventing damper 43 is held at a position facing generally vertically the first end part t1 of the warm air outlet 84 from the first support part 41. As a result, at the maximum cooling position Pc, the cooling space 7 and the heating space 8 are partitioned by the air mixing damper body 42, and the cooling space 7 is communicated with the air mixing space 91. Furthermore, at this time, a gap is formed in a generally vertical direction between the tips of the air mixing damper 4 and the foot switching damper 5.

In contrast, at the maximum heating position Ph, the leading end of the air mixing damper body 42 abuts against the third end part t3 of the guiding partition wall part 10 from the air mixing space 91 side. At the same time, the reheat preventing damper 43 abuts against the upper end part of the heater core 2 from the return space 83 side. As a result, the cooling space 7 is communicated with the heating space 8, and the heating space 8 is communicated with the air mixing space 91 via the return space 83.

In the air mixing space 91, at a region (i.e., above the heating space 8) generally facing the above-described guiding partition wall part 10 as viewed in the traveling direction, the foot outlet flow channel 92 is defined by the inner wall of the unit case 3. The foot outlet flow channel 92 is in communication with a foot outlet port (not illustrated) for feeding the air to passenger's feet in the vehicle.

The end part of the foot outlet flow channel 92 (the end part closer to the air mixing space 91) is a foot inlet E1 for introducing the air from the air mixing space 91. The foot inlet E1 is an opening which extends in a generally vertical direction as viewed in section. The upper end part of the foot inlet E1 is a fifth end part t5, and the lower end part of the foot inlet E1 is a sixth end part t6.

The foot switching damper 5 is provided at the foot inlet E1. The foot switching damper 5 is a plate-like member that is rotatably supported above the foot inlet E1. More specifically, the foot switching damper 5 includes a second support part 51, which pivots on a second axis A2 extending in the vehicle width direction, and a foot switching damper body 52, which extends along a plane transverse to the width direction across the second support part 51. The foot switching damper body 52 extends by the size from the fifth end part t5 to the sixth end part t6 of the foot inlet E1. Furthermore, the foot switching damper body 52 extends from the second support part 51 to the upper end part (fourth end part t4) of the above-described the guiding partition wall part 10. In other words, the size from the second support part 51 (the second axis A2) to the fourth end part t4 is substantially equal to the size from the second support part 51 to the sixth end part t6.

An elastic part 53, which is made of an easily elastically deformable material such as a sponge, is provided at the tip of the foot switching damper body 52 on the sixth end part t6 side (or the side contacting the fourth end part t4). More specifically, the elastic part 53 is provided on the foot switching damper body 52 at a part facing the air mixing space 91.

Figure 2:
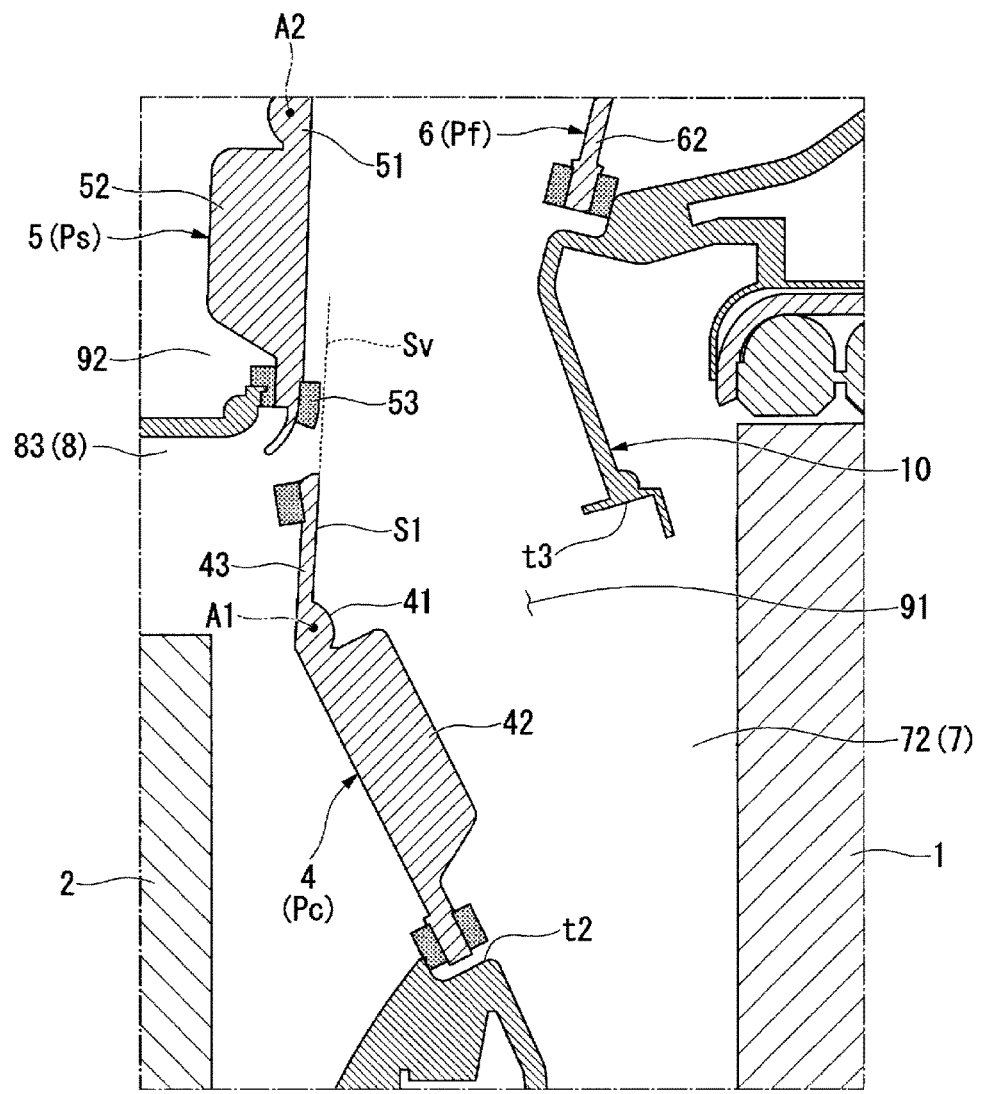
FIG. 2 is an enlarged cross-sectional view of the main parts of the vehicular air conditioning device according to an embodiment of the present invention.

The foot switching damper body 52 extends in the above-described the maximum cooling position Pc along a plane generally parallel to the reheat preventing damper 43 of the air mixing damper 4. More particularly, as illustrated in FIG. 2, the foot switching damper body 52 is generally parallel to the imaginary plane Sv including the principal plane S1 of the reheat preventing damper 43. Furthermore, the foot switching damper body 52 is further retracted toward the foot outlet flow channel 92 side than the imaginary plane Sv. In other words, the foot switching damper body 52 does not further protrude toward the air mixing space 91 side than the imaginary plane Sv. In particular, in the present embodiment, the above-described elastic part 53 is also retracted toward the foot outlet flow channel 92 side with respect to the imaginary plane Sv.

The foot switching damper 5 configured as described above is made rotatable between a position indicated by a solid line in FIG. 1 (a closing position Ps) and a position indicated by a dashed line (a communicating position Pt) in FIG. 1. At the closing position Ps, the both end parts of the foot switching damper body 52 respectively abut against the fifth end part t5 and the sixth end part t6 of the foot outlet flow channel 92. Hence, at the closing position Ps, the air mixing space 91 and the foot outlet flow channel 92 are partitioned by the foot switching damper body 52.

On the other hand, at the communicating position Pt, the end part of the foot switching damper body 52 abuts against the fourth end part t4 of the guiding partition wall part 10 from the air mixing space 91 side. Hence, the air mixing space 91 and the intermediary space 93 (described later) are partitioned, and the air mixing space 91 is communicated with the foot outlet flow channel 92.

Another space is formed above the air mixing space 91. Such another space serves as the intermediary space 93. The intermediary space 93 is a space for distributing the air supplied from the air mixing space 91 to the defroster outlet flow channel 95 and the face outlet flow channel 94, as will be described later.

At the region generally facing the foot inlet E1 from the traveling direction (i.e., the region positioned above the cooling space 7 and communicated with the intermediary space 93), the defroster outlet flow channel 95 is defined by the inner wall of the unit case 3. The defroster outlet flow channel 95 is communicated with a defroster outlet (not illustrated) for feeding defrosting air toward a windshield (a front window) from the inside of the vehicle.

The end part of the defroster outlet flow channel 95 (the end on the intermediary space 93 side) serves as a defroster inlet E2 for introducing the air from the intermediary space 93. As viewed in section, the defroster inlet E2 is an opening extending in a generally vertical direction. The upper end part of the defroster inlet E2 serves as a seventh end part t7, and the lower end part of the defroster inlet E2 serves as an eighth end part t8.

The face-defroster switching damper 6 is provided at the defroster inlet E2. The face-defroster switching damper 6 is a plate-like member to be rotatably supported over the defroster inlet E2. More specifically, the face-defroster switching damper 6 includes a third support part 61, which pivots on a third axis A3 extending in the vehicle width direction, and a face-defroster switching damper body 62, which extends from the third support part 61 along a plane transverse to the width direction. The face-defroster switching damper body 62 extends by the size from the seventh end part t7 to the eighth end part t8 of the defroster inlet E2. Furthermore, the face-defroster switching damper body 62 extends by the size from the third support part 61 to the fifth end part t5 of the foot inlet E1. In other words, the size from the third support part 61 (the third axis A3) to the fifth end part t5 is substantially the same as the size from the third support part 61 to the eighth end part t8.

Yet another space is provided above the intermediary space 93. This space serves as the face outlet flow channel 94. The face outlet flow channel 94 is a channel for taking in the air from the intermediary space 93 and feeding the air to a face outlet (not illustrated) disposed within the interior space of the vehicle. The face outlet is provided mainly for feeding cool air or warm air to the upper body of a passenger.

The face-defroster switching damper 6 is rotatable between a face position Pf indicated by a solid line in FIG. 1 and a defroster position Pd indicated by a dashed line in FIG. 1. At the face position Pf, the leading end of the face-defroster switching damper body 62 abuts against the eighth end part t8 of the defroster inlet E2 from the intermediary space 93 side. Thus, the defroster outlet flow channel 95 and the intermediary space 93 are partitioned, and the intermediary space 93 is communicated with the face outlet flow channel 94.

On the other hand, at the defroster position Pd, the leading end of the face-defroster switching damper body 62 abuts the fifth end part t5 of the foot inlet E1 from the intermediary space 93 side. Thus, the defroster outlet flow channel 95 is communicated with the intermediary space 93, and the intermediary space 93 and the face outlet flow channel 94 are partitioned.

With the configuration described above, by rotating the air mixing damper 4, the foot switching damper 5, and the face-defroster switching damper 6 respectively, the ratio of mixing the cool air from the cooling space 7 and the warm air from the heating space 8 are adjusted, and in addition, the distribution state of air to the channels (the foot outlet flow channel 92, the defroster outlet flow channel 95, and the face outlet flow channel 94) are switched.

First, a case in which the vehicular air conditioning device 100 is used for a cooling operation (at the maximum cooling operation) will be described. At the maximum cooling operation, the air mixing damper 4 is maintained at the above-described maximum cooling position Pc indicated by the solid line in FIG. 1. More specifically, the leading end of the air mixing damper body 42 is maintained in abutment against the second end part t2 of the warm air outlet 84, and the leading end of the reheat preventing damper 43 is maintained vertically facing the first end part t1 of the warm air outlet 84.

Thus, the cooling space 7 and the heating space 8 are partitioned by the air mixing damper 4, and the air cooling space 7 is communicated with the air mixing space 91. In such a state, the air is sent into the cooling space 7 from the fan, not illustrated. The air introduced in the cooling space 7 is brought into contact with the evaporator 1 from the introducing space 71 side, thus the heat of the air is absorbed, and the air becomes cool air. The cool air flows into the air mixing space 91, which is communicated with the cooling space 7 (the cool air supply space 72), by blowing of the fan. Furthermore, after flowing upward from the air mixing space 91, the cool air is guided to any one of the face outlet flow channel 94, the defroster outlet flow channel 95, and the foot outlet flow channel 92, depending on the positions of the foot switching damper 5 and the face-defroster switching damper 6.

Specifically, when the foot switching damper 5 is positioned at the closing position Ps indicated by the solid line in FIG. 1, the air mixing space 91 and the foot outlet flow channel 92 are partitioned by the foot switching damper body 52, and the air mixing space 91 is communicated with the intermediary space 93. Accordingly, the cool air supplied from the cooling space 7 flows toward the intermediary space 93 without flowing into the foot outlet flow channel 92. The air having flowed to the intermediary space 93 then flows to any one of the face outlet flow channel 94, and the defroster outlet flow channel 95, depending on the position of the face-defroster switching damper 6 (the face position Pf or the defroster position Pd).

When the foot switching damper 5 is at the closing position Ps and the face-defroster switching damper 6 is at the face position Pf, the air flowing through the intermediary space 93 flows toward the face outlet flow channel 94. In contrast, when the face-defroster switching damper 6 is at the defroster position, Pd, the air flowing through the intermediary space 93 flows toward the defroster outlet flow channel 95.

Subsequently, a case in which the vehicular air conditioning device 100 is used for a heating operation (at the maximum heating operation) will be described. At the maximum heating operation, the air mixing damper 4 is held at the above-described maximum heating position Ph as indicated by the dashed line in FIG. 1. More specifically, the leading end of the air mixing damper body 42 abuts against the third end part t3 of the guiding partition wall part 10 from the air mixing space 91 side. At the same time, the reheat preventing damper 43 abuts against the upper end part of the heater core 2 from the return space 83 side.

Thus, the cooling space 7 is communicated with the heating space 8, and in addition, the heating space 8 is communicated with the air mixing space 91 via the return space 83. In such a state, the air is sent into the cooling space 7 from the fan, not illustrated. The air is introduced into the cooling space 7, and flows into the heating space 8, which is connected to the cooling space 7, from the second introducing space 81 side, by blowing of the fan. The air is brought into contact with the heater core 2 in the heating space 8 and becomes warm air. Furthermore, such warm air flows upward along the heating space 8 (the warm air supply space 82), and then flows into the air mixing space 91, which is in communication with the return space 83, via the return space 83.

The warm air flows into the air mixing space 91 and flows upward. Then, as described above, the warm air flows toward any one of the face outlet flow channel 94, the defroster outlet flow channel 95, and the foot outlet flow channel 92, depending on the positions of the foot switching damper 5 and the face-defroster switching damper 6.

The air mixing damper 4 is freely rotatable between the above-described maximum cooling position Pc and the above-described maximum heating position Ph as described above. In other words, a mixing ratio between the cool air and the warm air is appropriately adjusted by holding the air mixing damper partway between the maximum cooling position Pc and the maximum heating position Ph. More particularly, when the air mixing damper 4 is held at a position closer to the maximum cooling position Pc, it is possible to supply air with a relatively low temperature to the inside of the vehicle. On the other hand, when the air mixing damper 4 is held at a position closer to the maximum heating position Ph, it is possible to supply air with a relatively high temperature to the inside of the vehicle.

During the maximum cooling operation described above, it is necessary to suppress inadvertent interchange of heat between the heater core 2 and the evaporator 1 in order to improve the thermal efficiency (to improve the cooling efficiency). In particular, it is necessary to reduce the possibility of effect of the heat quantity of the heater core 2 on the air cooled by the evaporator 1 (cool air).

Hence, in the vehicular air conditioning device 100 according to the present embodiment, the reheat preventing damper 43 provided at the air mixing damper 4 partitions the air mixing space 91 and the heating space 8 (the return space 83) during the maximum cooling operation. In addition, the principal plane S1 of the reheat preventing damper 43 is further retracted toward the air mixing space 91 side than the foot switching damper 5.

In other words, the foot switching damper 5 does not further protrude toward the air mixing space 91 side than the imaginary plane Sv including the principal plane S1 of the reheat preventing damper 43.

Therefore, it is possible to reduce the possibility that the air supplied from the cooling space 7 flows over the reheat preventing damper 43 into the heating space 8. In other words, almost all amount of the air supplied from the cooling space 7 is guided by the reheat preventing damper 43, and flows into the air mixing space 91. Therefore, it is possible to reduce the possibility that the heat quantity of the heater core 2 is added to the air supplied from the cooling space 7.

On the other hand, when the principal plane S1 of the reheat preventing damper 43 is further retracted toward the heating space 8 side than the foot switching damper 5, the cool air flowing upward along the reheat preventing damper 43 may impinge on the foot switching damper 5 from below, and then flow into the heating space 8 (the return space 83). In this case, the cool air is heated by the heater core 2 in the heating space 8, is then involved in the convection in the heating space 8, and flows into the air mixing space 91 again. Thus, even during the maximum cooling operation, the heat quantity of the heater core 2 may be added to the cool air, and the cooling efficiency may decrease.

However, in the vehicular air conditioning device 100 according to the present embodiment, as described above, the imaginary plane Sv including the principal plane S1 of the foot switching damper 5 does not further protrude toward the air mixing space 91 side than the reheat preventing damper 43. Accordingly, the cool air is smoothly guided by the reheat preventing damper 43, and flows upward (toward the intermediary space 93) without impinging on the foot switching damper 5. Therefore, it is possible to sufficiently reduce the possibility of capability reduction (reduction of the cooling efficiency) during the maximum cooling.

Furthermore, according to the configuration described above, when the air mixing damper 4 is located at the maximum cooling position Pc, the air mixing damper body 42 partitions the cooling space 7 and the heating space 8, and in addition, communicates the cooling space 7 with the air mixing space 91. In other words, the heating space 8 is brought into a state of being isolated from the cooling space 7 and the air mixing space 91. Accordingly, it is possible to reduce the possibility of mixing the warm air from the heating space 8 with the cool air flowing from the cooling space 7.

In addition, according to the configuration described above, when the foot switching damper 5 is located at the closing position Ps, the air mixing space 91 is communicated with the intermediary space 93. This makes it possible to feed the air from the air mixing space 91 to a channel different from the foot outlet flow channel 92. On the other hand, when the foot switching damper 5 is located at the communicating position Pt, the air mixing space 91 is communicated with the foot outlet flow channel 92. This makes it possible to feed the air toward the foot outlet flow channel 92.

Furthermore, according to the configuration as described above, when the foot switching damper 5 is located at the communicating position Pt, the elastic part 53 is interposed between the foot switching damper 5 and the unit case 3. Furthermore, in the state of abutting against the unit case 3, the elastic part 53 is slightly subjected to elastic deformation. This makes it possible to sufficiently block the gap between the foot switching damper 5 and the unit case 3. In other words, when the foot switching damper 5 is located at the communicating position Pt, it is possible to supply almost all amount of the air fed from the air mixing space 91 to the foot outlet flow channel 92a.

Furthermore, according to the configuration described above, it is possible for the face-defroster switching damper 6 to guide the air flowing through the intermediary space 93 to the face outlet flow channel 94 and the defroster outlet flow channel 95. In other words, the air flowing through the intermediary space 93 is guided to a plurality of channels, and thus it is possible to use the air more effectively.

One embodiment of the present invention has been described with reference to the drawings. However, the above-described configuration is merely one example. Various changes and modifications can be made without departing from the scope of the present invention.

For example, in the above-described embodiments, the vehicular air conditioning device 100 is positioned in the vehicle width direction. However, the arrangement direction and attitude of the vehicular air conditioning device 100 are not limited by the above-described embodiments, and may be appropriately changed depending on a design and a specification.

For the embodiments above, the descriptions have been given on the configuration in which the channels communicated with the air mixing space 91 include the face outlet flow channel 94, the defroster outlet flow channel 95, and the foot outlet flow channel 92. However, examples of the channels are not limited to those described above. For example, in addition to the respective channels listed above, another channel for feeding air toward a rear sheet or the like of the vehicle may be provided.

Further, in addition to the respective channels listed above, the above-described channels, directions and sizes that the respective dampers extend, or the relative positional relationships between the respective parts are not limited by the above-described embodiments, and may be appropriately changed depending on a design and a specification.

INDUSTRIAL APPLICABILITY

According to the vehicular air conditioning device described above, the cooling efficiency is further enhanced.

REFERENCE NUMERALS

1 Evaporator
2 Heater core
3 Unit case
4 Air mixing damper
5 Foot switching damper
6 Face-defroster switching damper
7 Cooling space
8 Heating space
10 Guiding partition wall part
41 First support part
42 Air mixing damper body
43 Reheat preventing damper
51 Second support part
52 Foot switching damper body
53 Elastic part
61 Third support part
62 Face-defroster switching damper body
71 Introducing space
72 Cool air supply space
73 Cool air outlet
81 Second introducing space
82 Warm air supply space
83 Return space
84 Warm air outlet
91 Air mixing space
92 Foot outlet flow channel
93 Intermediary space
94 Face outlet flow channel
95 Defroster outlet flow channel
100 Vehicular air conditioning device
A1 First axis
A2 Second axis
A3 Third axis
E1 Foot inlet
E2 Defroster inlet
Pc Maximum cooling position
Pd Defroster position
Pf Face position
Ph Maximum heating position
Ps Closing position
Pt Communicating position
S1 Principal plane
Sv Imaginary plane
t1 First end part
t2 Second end part
t3 Third end part
t4 Fourth end part
t5 Fifth end part
t6 Sixth end part
t7 Seventh end part
t8 Eighth end part

The invention claimed is:
1. A vehicular air conditioning device comprising:
an evaporator configured to cool air;
a heater core configured to heat air;
a unit case including a cooling space configured to accommodate the evaporator, a heating space con- nected to the cooling space and configured to accommodate the heater core, an air mixing space connected to the cooling space and the heating space, and a foot outlet flow channel connected to the air mixing space;

an air mixing damper provided among the cooling space, the heating space, and the air mixing space, in the unit case, and configured to rotate between a maximum cooling position and a maximum heating position to adjust a ratio of air to be introduced into the air mixing space between the air from the cooling space and the air from the heating space; and a foot switching damper rotatable to a closing position for partitioning the air mixing space and the foot outlet flow channel, wherein the air mixing damper includes a reheat preventing damper including a principal plane facing the air mixing space at the maximum cooling position, and configured to define a gap between a tip of the air mixing damper and a tip of the foot switching damper at the maximum cooling position, and to partition the heating space and the air mixing space, at the closing position, the foot switching damper includes a foot switching damper body extending along an imaginary plane including the principal plane of the reheat preventing damper, and at the closing position, the foot switching damper body of the foot switching damper is further retracted toward the foot outlet flow channel side than the imaginary plane of the reheat preventing damper.

2. The vehicular air conditioning device according to claim 1,
wherein the air mixing damper includes an air mixing damper body configured to partition the cooling space and the heating space at the maximum cooling position, to communicate the cooling space with the air mixing space, to communicate the cooling space with the heating space at the maximum heating position, and to partition the cooling space and the air mixing space.

3. The vehicular air conditioning device according to claim 1,
wherein the unit case includes an intermediary space connected to the air mixing space,
the closing position is a position for the foot switching damper to partition the air mixing space and the foot outlet flow channel and to communicate the air mixing space with the intermediary space, and
the foot switching damper communicates the closing position with the air mixing space and the foot outlet flow channel, and is rotatable between a communicating position for closing the air mixing space and the intermediary space.

4. The vehicular air conditioning device according to claim 3,
wherein the foot switching damper includes an elastic part at a region facing the air mixing space at the closing position, the elastic part abutting against the unit case at the communicating position.

5. The vehicular air conditioning device according to claim 3,
wherein the unit case includes a face outlet flow channel connected to the intermediary space and a defroster outlet flow channel connected to the intermediary space,
further comprising a face-defroster switching damper configured to adjust a ratio of air from the intermediary space between air to be introduced to the face outlet flow channel and air to be introduced to the defroster outlet flow channel.

* * * * *